United States Patent [19]

Mueller et al.

[11] 4,179,902
[45] Dec. 25, 1979

[54] HOT WATER SYSTEM AND CONDENSING UNIT THEREFOR

[75] Inventors: Paul Mueller; Ray A. Prine, both of Springfield, Mo.

[73] Assignee: Paul Mueller Company, Springfield, Mo.

[21] Appl. No.: 927,153

[22] Filed: Jul. 21, 1978

Related U.S. Application Data

[62] Division of Ser. No. 823,927, Aug. 12, 1977, Pat. No. 4,146,089.

[51] Int. Cl.² .................... F25B 27/02; F28F 1/14; F28F 1/36
[52] U.S. Cl. ............................ 62/238; 165/DIG. 13; 165/184
[58] Field of Search ............ 62/238 E; 165/DIG. 13, 165/182, 183, 184

[56] References Cited

U.S. PATENT DOCUMENTS

| | | | |
|---|---|---|---|
| 2,632,306 | 3/1953 | Ruff | 62/238 E |
| 3,188,829 | 6/1965 | Siewert et al. | 62/238 E |
| 3,301,002 | 1/1967 | McGrath | 62/238 E |
| 3,498,072 | 3/1970 | Stiefel | 62/238 E |
| 3,513,663 | 5/1970 | Martin, Jr. et al. | 62/238 E |
| 4,041,726 | 8/1977 | Mueller et al. | 62/238 E |

Primary Examiner—Lloyd L. King

Attorney, Agent, or Firm—Rogers, Eilers & Howell

[57] ABSTRACT

This invention relates to a hot water system which utilizes heat from the refrigerant of a refrigeration system to produce hot water. The utilized heat consists of the superheat of the refrigerant vapor, the latent heat of condensation, and part of the sensible heat of the liquid refrigerant. The water passing through a water-cooled condenser, which is part of the refrigeration system, is heated to a selected temperature by removal of both the superheat of refrigerant vapor, the latent heat of condensation, and part of the sensible heat of the liquid refrigerant as it passes through the condenser. The condenser has a water inlet and an outlet between which is connected a hot water storage tank. As the water in the condenser is heated by absorption of the superheat of the refrigerant vapor, the latent heat of condensation, and part of the sensible heat of the liquid refrigerant passing therethrough, the heated water rises and flows by convection into the storage tank. Eventually the storage tank may fill completely with water of a selected temperature. A temperature responsive flow restriction device, or thermostat, is located between the water outlet of the condenser and the storage tank, which restricts the flow of water below a preselected temperature. The heated water, being lighter than the balance of the water in the tank, will remain stratified at the top of the tank and may be drawn off as needed.

12 Claims, 12 Drawing Figures

HOT WATER SYSTEM AND CONDENSING UNIT THEREFOR

This is a division, of application Ser. No. 823,927 filed Aug. 12, 1977, now U.S. Pat. No. 4,146,089.

BACKGROUND OF THE INVENTION

This application is a continuation-in-part of U.S. Patent Application Ser. No. 671,579, now U.S. Pat. No. 4,041,726 filed Mar. 29, 1976. It is very common to have a refrigeration and/or air conditioning requirement and a simultaneous need for hot water. Generally, the refrigeration system is operated totally separate from the hot water system with the result that the heat removed in the condensing process of the refrigeration system is wasted, while the water in the hot water system is heated by means of an external energy source such as gas, electricity, or oil. The cost of such fuel can be great particularly in situations where large amounts of hot water are required. The purpose of this invention is to reduce or eliminate the need for these expensive fuels and to utilize the heat energy in the condensing process of the refrigeration system to produce the hot water.

A primary example of a situation where refrigeration is used and large amounts of hot water are needed is on the modern dairy farm. Such farms have milk coolers into which the milk from the cows is fed by means of automatic milking devices. The milk is fed directly into the central cooler, or milk cooler, during the milking process. These coolers are refrigerated to remove heat from the milk promptly after it is produced. Thus, the evaporator of the refrigeration system is located in the milk cooler with the other components including the condenser located elsewhere. Generally, the condenser is air cooled in a conventional manner, or it may be water cooled with much or all of the water wasted. In either case, much of the heat taken from the milk as it is cooled is wasted, and it is a primary purpose of this invention to utilize such heat for the production of hot water.

In addition to requiring a refrigeration system for the prompt cooling of the milk, the modern dairy farm also has a large requirement for hot water at different temperatures. For example, on the same farm, large amounts of hot water are needed for prepping the cows, washing the milk cooler, the pipeline, milker, other components of the milking equipment, and the milking parlor itself. It is also desirable to heat the cows' drinking water in the winter. Water at about 100° F. or so would be used for prepping or cleaning the cows, but much hotter water, about 140° F. is required for cleaning the milking apparatus and milk cooler. Of course, if a large quantity of hot water can be produced at about 140° F., it follows that larger amounts of warm water, about 100° F., can easily be available. For example, the appropriate water temperature for prepping cows (approximately 100° F.) can be obtained by either mixing the 140° water discharged through the thermostat with cold water or by removing water ahead of the thermostat before it reaches about 140° and tempering it as required with cooler water. The latter is the preferred method since it materially reduces the condensing temperature, thus increases the refrigerating capacity. Thus, a principal object of this invention is to produce large quantities of hot water by utilizing heat absorbed in the condensing process of the refrigeration system.

Generally, in accordance with this invention, the water is heated by transferring the superheat of the refrigerant vapor, the latent heat of condensation, and part of the sensible heat of the liquid refrigerant in a uniquely designed heat exchanger or condenser. The heated water then circulates by convection, when the water reaches a selected temperature, into a hot water storage tank where the water remains stratified with the hot water at the top of the tank and the colder water at the bottom. As more water is heated in the condenser, the marginal line of stratification in the tank moves progressively lower. The tank may fill completely with hot water at the selected temperature.

The heating of water to produce stratification in a hot water storage tank by means of convection is known in the art. One such construction is known as a "sidearm" heater which consists of a hot water storage tank connected between the inlet and outlet of a heater device. The heater device consists of a coil of copper tubing or the like which is located near the bottom and off to the side of the hot water tank. One end of the tubing is connected to the bottom of the tank and the other end to the top. Of course, an inlet is provided at the bottom of the tank from a cold water supply and an outlet is provided at the top of the tank for the dispensing of hot water. A heating element, such as a gas burner, is located just beneath the heater coil to heat the water in the coil by means of outside energy. In operation, the burner heats the water in the coil which causes the water in the coil to rise by convection and enter the top of the storage tank. The water in the storage tank stratifies until the tank becomes completely full of hot water.

It is also known in the art to utilize some of the heat from the condensing process of the refrigeration system to produce hot water in a storage tank. For example, such a system is described in an article in the June, 1962, issue of "Refrigeration Service and Contracting," page 19.

That article describes a system whereby two units are used, one called a "heat exchanger" and the other called a "final condenser" whereby in the production of hot water at approximately 160° F., the superheat is removed from the refrigerant in the "heat exchanger," with the latent heat and the subcooling heat being removed at the "final condenser." The hot water is produced from the "heat exchanger" only.

In accordance with this invention, hot water at approximately 140° F. is produced in a single condenser by the removal of the superheat of refrigerant vapor, the latent heat of condensation, and part of the sensible heat of the liquid refrigerant in the single unit.

SUMMARY OF THE INVENTION

Generally, the invention comprises a condenser which is part of a refrigeration system, such as used to cool the milk in a milk cooler on a dairy farm. In one embodiment of the invention, the condenser includes a lower housing containing multiple layers of coils having multiple windings to provide significantly greater heat exchange surface than would normally be provided in such a refrigeration system to accomplish the necessary cooling. The areas between the housing and the coils define a water jacket, and the housing includes a water inlet and a water outlet, the water passing by convection from the inlet, over the coils, where it absorbs both the superheat of the refrigerant vapor, the latent heat of condensation, and part of the sensible heat of the liquid refrigerant passing therethrough, and then through the outlet of the housing. Means are provided for connecting the outlet of the housing to a vertical riser tube in which a thermostat or the like is mounted for restricting the flow of water below a selected temperature. A storage tank has an upper inlet connected to the output of the thermostat and a lower outlet connected to the inlet of the condenser housing. A hot water outlet is provided at the top of the tank and a cold water inlet is provided at the bottom and is connected to a suitable source of cold water.

Another embodiment of the condenser of this invention differs from the first primarily in the design of the heat exchange portion. In the second embodiment, the heat exchanger comprises an inverted can or container inside the housing with a de-superheating coil of tubing located between the top of the housing and the top of the can or container. A coiled sheet heat exchange surface, preferably of a pillowed type, is located between the sides of the housing and the container such that refrigerant passes downwardly first through the coil of tubing at the top where it is de-superheated, thence through the coiled sheet heat exchange surface around the sides where it is condensed. The water passing through the condenser flows upwardly through the channels defined between the sides of the housing and the container and thus between the coiled layers of the sheet heat exchange surface, and thence between the windings of the coil at the top, all by convection flow. This unique design is particularly easy to produce, durable and effective against corrosion and the like, and produces ample quantitites of hot water near the top of the condenser with relatively low pressure drop in the refrigerant as it passes through the condenser.

In a preferred embodiment of the invention, various of the components of the refrigeration system are mounted on top of the condenser housing, and the riser tube extends directly out of the top of the housing. In alternate embodiments, more than one storage tank can be connected in parallel, or a hot water heater of conventional design can be connected in series with the hot water outlet of the storage tank.

Thus, it is a primary object of this invention to provide a system for producing hot water by utilizing the superheat of refrigerant vapor, the latent heat of condensation, and part of the sensible heat of the liquid refrigerant in a single condenser of a refrigeration system from which the hot water is produced.

Another object is to produce substantial amounts of hot water without producing any significant amount of warm water which is not hot enough for cleansing purposes or cool enough to perform the necessary condensing function.

It is another primary object of this invention to provide a condenser for such a system which produces large quantities of hot water while also performing the condensing function for the refrigeration system, is durable and corrosion resistant, is relatively simple in construction, and which produces large quantities of hot water while maintaining a relatively low pressure drop for the refrigerant as it passes through the condenser.

These and other objects of the invention are apparent from the drawings and detailed description to follow.

DETAILED DESCRIPTION OF A PREFERRED EMBODIMENT

Figure 1:
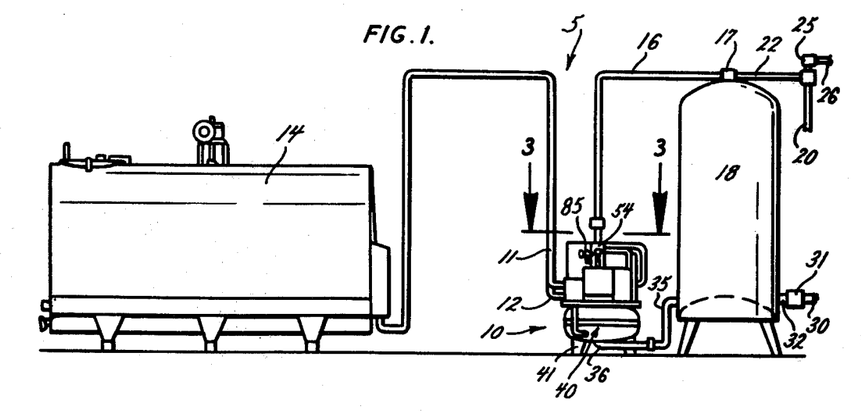
FIG. 1 is a side elevation of a condenser of this invention as shown connected in a hot water system of this invention.

Referring to FIG. 1 of the drawing there is shown a hot water system 5 including a condenser 10 connected by means of suitable refrigeration conduit 11 and 12 to an evaporator coil (not shown in FIG. 1) suitably mounted in a milk cooler 14 in a manner known in the art. The milk cooler 14 may be of a type commonly found on dairy farms for the accumulation and cooling of milk from the milking process.

The condenser 10 will be described in greater detail, but with reference to FIG. 1 it includes a water outlet connected by means of a water conduit 16 to the hot water inlet 17 at the top of a hot water storage tank 18. The inlet 17 is also connected to a hot water outlet 20 by means of a water conduit 22. A temperature/pressure relief valve 25 is connected to the outlet 20 and to a drainpipe 26 in a manner commonly known and used with standard hot water heaters. The valve 25 is a safety valve to prevent rupture of the tank due to excessive heat or pressure and is generally a requirement on all water heaters.

A source of cold water is connected to the bottom of the tank 18 by means of a conduit 30 which is connected to a check valve 31, the output of which is connected to the cold water inlet 32 of the tank. The bottom of the tank is also connected by means of a water conduit 35 to the cold water inlet 36 of the condenser 10.

Figure 5:
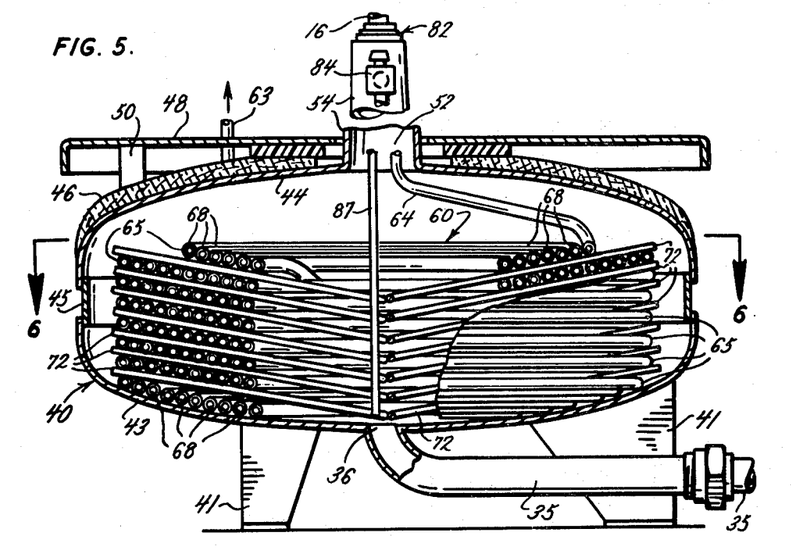
FIG. 5 is a view in section taken generally along the line 5—5 of FIG. 3.

Referring to FIG. 5, the condenser 10 includes a housing 40 with leg supports 41. The housing 40 has a dished bottom portion 43 and a dished top portion 44 welded together or spaced apart and welded to band 45. The top portion 44 is covered with an insulating material such as a fiberglass mat 46. A platform 48 is supported on the top of the housing 40 by means of support brackets 50. The cold water inlet 36 is at the center and bottom of the housing, and there is a hot water outlet 52 at the center and top of the housing. A vertical riser tube 54 is connected to the hot water outlet 52.

Figure 6:
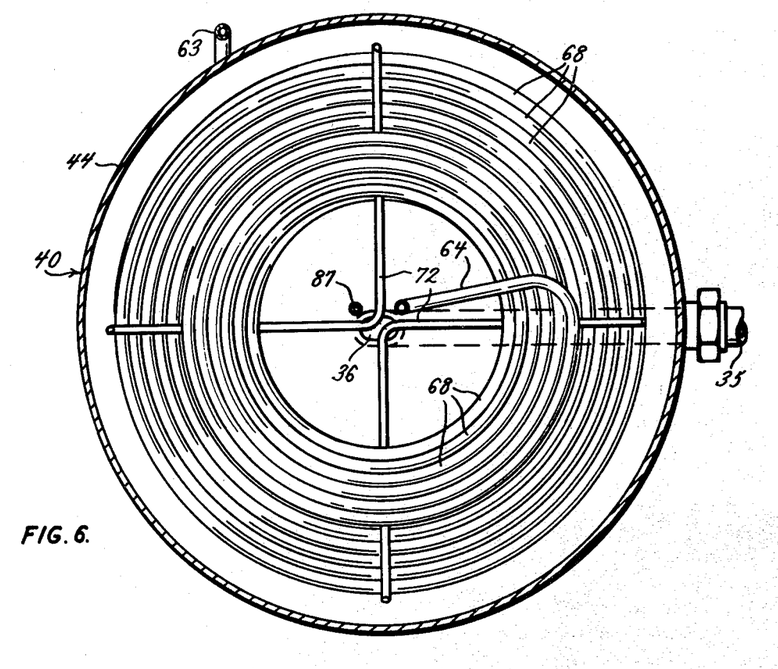
FIG. 6 is a view in section taken generally along the line 6—6 of FIG. 5.

The major portion within the housing 40 is occupied by the windings of a condenser coil assembly 60 as best shown in FIGS. 5 and 6. The coil assembly 60 is generally one continuous coil having a refrigerant inlet 62 (shown in FIG. 7) and a refrigerant outlet at the bottom connected to a conduit 63 extending upwardly outside the condenser housing and above the platform 48. The coil assembly 60 is formed by a vertical tube 64 extending downwardly from the inlet 62 and within the riser tube 54 to multiple layers 65 of windings preferably of copper located in the tank 40, each winding being oriented generally horizontally and having multiple turns 68. The coil layers are held separated by rods 72 formed at 90 degrees as best shown in FIG. 6. It has been found that this coil and housing arrangement makes it possible to provide a large heat exchange surface within the single condenser for removal of all the superheat of refrigerant vapor, the latent heat of condensation, and part of the sensible heat of the liquid refrigerant as it passes through the coil assembly to produce water of a temperature of about 140° F. at the condenser outlet with a maximum water inlet temperature of about 60° F. to 80° F. This is possible due to the unique design wherein the water in the condenser is permitted to stratify and the refrigerant flows counter-current to the water. In a typical application using refrigerant 22, the hot refrigerant enters the heat exchanger at about 240° F. in the vicinity of the water discharge, and leaves the heat exchanger at about 110° F. The cold water enters the bottom of the housing at about 60° F. in the vicinity of the refrigerant discharge, and leaves out the top at about 140° F.

A thermostat 80 (FIG. 4), which may be of the automotive type, is mounted in the vertical riser tube 54 just above the inlet 62 of the condenser coil 60 by means of a suitable coupling 82. Beneath the thermostat 80 is a water bypass head pressure valve 84 (FIG. 3), which is solenoid operated and responsive to excessive head pressure of the refrigeration system compressor to waste water from the hot water system so as to bring colder water into the condenser as required.

Figure 3:
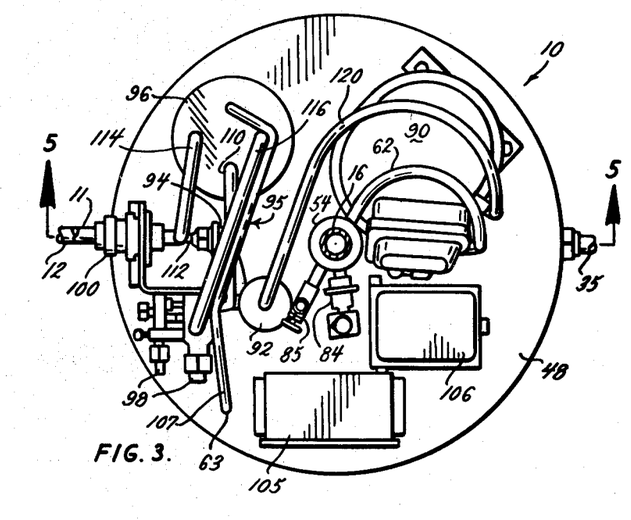
FIG. 3 is a view taken generally along the line 3—3 of FIG. 1.
Figure 4:
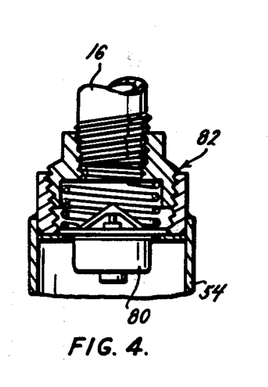
FIG. 4 is a vertical section through the riser tube portion of the condenser showing the thermostat mounting.

Also beneath the thermostat 80 is a mixing valve 85 having its hot water inlet connected by a conduit 86 to the riser tube 54 at a location beneath the thermostat, and having its cold water inlet connected to a conduit 87 which extends downwardly within the riser tube 54 and terminates near the bottom of the tank 40 where it receives cold water fed into the tank. The valve 85 has an outlet 88 for delivery of warm water. The drawing of hot water from beneath the thermostat and the mixing of same with cold water in the manner described as warm water is required, increases the replacement rate of hot water with cold water in the tank 40 and thus increases the capacity of the refrigeration system. The refrigerant in the vertical tube 64 helps to heat the water in the riser tube 54 and correspondingly makes the thermostat respond more quickly.

Various components of the refrigeration system are mounted on the support 48. These include the compressor 90, a filter dryer 92, a subcooling valve 94, a heat exchanger 95, and an accumulator/heat exchanger 96. Also included is the appropriate refrigeration conduit for connection of the various components, service valves 98, quick disconnect connections 100 and 101 for making connections from the evaporator coil 102 in the milk cooler 14, and appropriate electrical control boxes 105 and 106.

Figure 2:
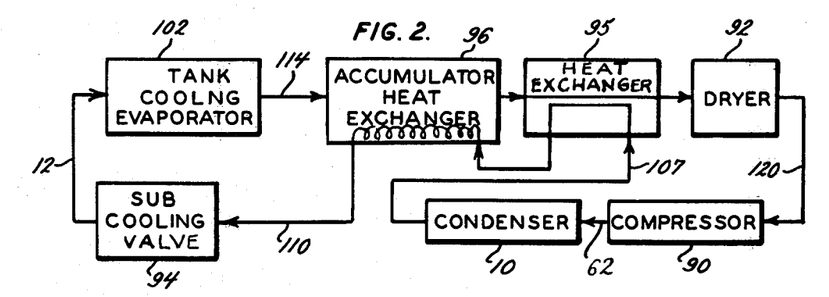
FIG. 2 is a schematic, or block diagram, of a refrigeration system of a type used with this invention.

The refrigeration system, for example, may be of the type described in U.S. Pat. No. 3,264,837. The output of the compressor 90 is connected by means of a refrigeration conduit 62 to the input of the condenser 10, the output 63 of which is connected by a conduit 107 through the heat exchanger 95 and to an input of the accumulator/heat exchanger 96. The accumulator/heat exchanger 96 is a device commonly known in the art which not only accumulates liquid that might go into the suction line, but also has a heat exchange coil for boiling off the accumulated liquid. Thus, the refrigerant line 107 which passes through the heat exchanger 95 is connected to his coil inside the accumulator/heat exchanger 96, and the output of that coil is connected by a refrigerant line 110 to the input of the subcooling valve 94. The output of the valve 94 is connected by a refrigerant line 112 to the quick disconnect connection 101 and then through that connection and the line 12 to the input of the evaporator 102.

The output of the evaporator is connected by means of the line 11 to the quick disconnect connection 100, and then through a refrigerant line 114 to another input of the accumulator/heat exchanger 96. An output of the accumulator 96 is connected by means of a refrigerant line 116, and through the heat exchanger 95, to the input of the dryer 92, the output of which is connected by means of a refrigerant line 120 to the input of the compressor 90.

Thus, in a preferred embodiment of the invention, the condenser 10 includes all of the components of the refrigeration system except the evaporator in the configuration heretofore described. While a particular type of refrigeration system has been described, it is to be understood that other types of refrigeration systems could also be used such as one of the more conventional direct expansion types commonly known.

Figures 7, 8:
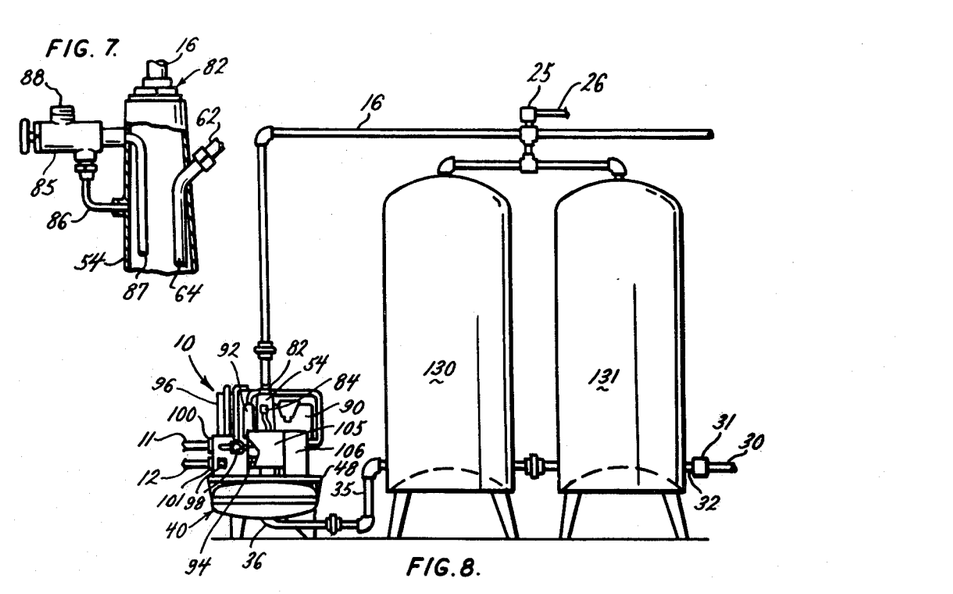
FIG. 7 is a fragmentary, partially sectional view of the upper portion of the riser tube.
FIG. 8 shows a modified embodiment of the hot water system of FIG. 1 using two storage tanks in parallel.

In FIG. 8 there is shown another embodiment of the invention where the storage tank 18 is replaced with two storage tanks 130 and 131 connected in parallel as shown.

Figure 9:
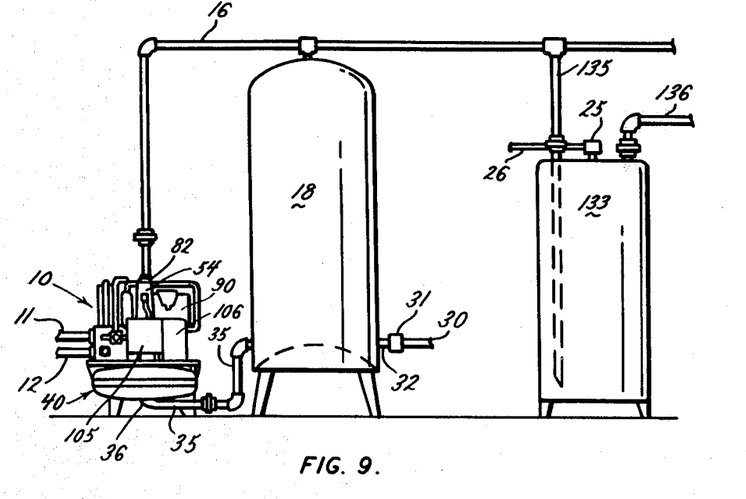
FIG. 9 is a modified embodiment of FIG. 1 showing a standard hot water heater in series with the outlet of the hot water system of FIG. 1.

In FIG. 9 there is shown still another embodiment of the invention where a standard hot water heater 133, which is heated from an external source of fuel, is connected in series at the output of the tank 18. The tank 133 need not be described since it is of the standard type commonly known in the art having an inlet 135 and an outlet 136.

Figure 10:
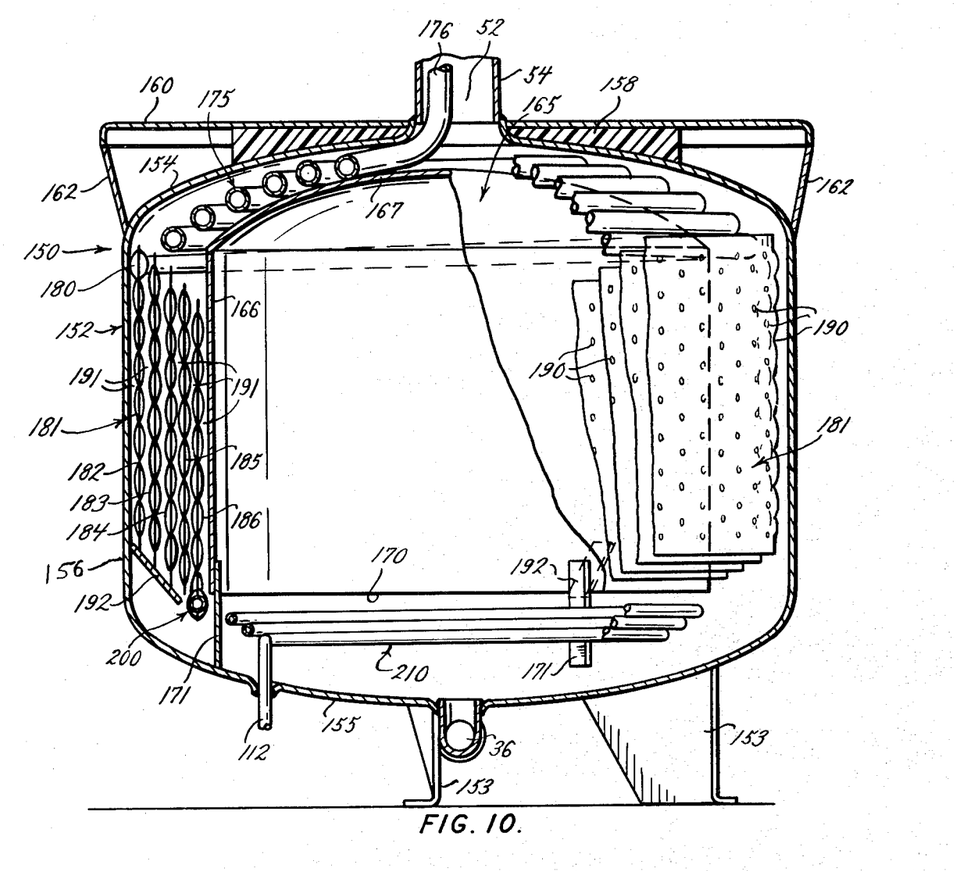
FIG. 10 is a view in section similar to FIG. 5 but of another embodiment of the condenser of this invention.
Figures 11, 12:
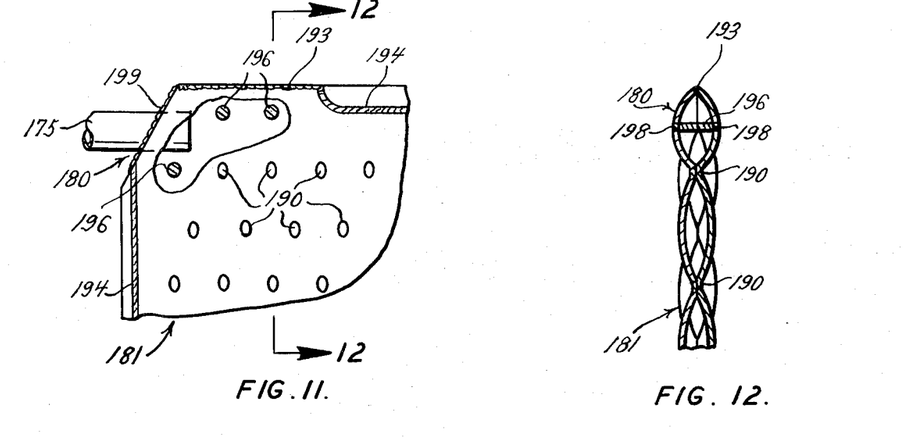
FIG. 11 is a fragmentary view of the inlet portion of the sheet heat exchange surface used in the condenser of FIG. 10.
FIG. 12 is a view in section taken generally along the line 12—12 of FIG. 11.

Referring to FIGS. 10 through 12 of the drawing, there is shown another embodiment of the condenser of this invention which may be substituted for the condenser 10 heretofore described. Thus, there is shown a condenser 150 having a tank or housing 152 with leg supports 153. Like the condenser 10, the condenser 150 has dished top and bottom portions 154 and 155 spaced from each other by a cylindrical sidewall 156. The housing 152 is preferably of stainless steel and may be constructed with the dished top and bottom portions and the cylindrical wall portion welded together to form the complete housing. The top portion may be covered with an insulating material 158 such as the fiberglass mat 46 of the condenser 10. The condenser 150 also has a platform 160 supported on the top of the tank by means of brackets 162. The platform 160 serves the same purpose as the platform 48 of the condenser 10. It will be noted that the height of the condenser 150 is greater than that of the condenser 10 to house the heat exchange material to be described.

Like the condenser 10, the condenser 150 has the cold water inlet 36 at the center and bottom of the housing and the hot water outlet 52 at the center and top of the housing. Also, the vertical riser tube 54 is connected to the hot water outlet and contains the components, such as the thermostat 80, the coupling 82, the bypass head pressure valve 84, and so on, just as with the first described embodiment.

The major differences between the condensers 10 and 150 are within the housings. Within the housing 152 is an inverted can or container 165 having a cylindrical wall 166 generally concentric with the outer wall 156, and a dish shaped top 167, all spaced inwardly from the housing 152. The container 165 is open at its bottom end 170 where it is spaced from the bottom of the housing 152 by supports 171.

The heat exchange structure within the housing consists of an upper coil 175 which has multiple, continuous turns with an inlet at the top similar to the inelt 62 of the first described embodiment. A vertical tube 176 similar to the tube 64 of the first described embodiment, extends downwardly from the inlet and within the riser tube 54 to coil 175 which is located between, and generally follows the shape of, the dished shape tops of the housing 152 and inverted container 165.

The outlet end of the coil 175 is connected to an intake manifold 180 (FIGS. 11 and 12) of a coiled sheet type heat exchange surface 181 located between the cylindrical sides of the housing 152 and inverted container 165. The sheet 181 has several turns 182 through 186 which are continuous. While approximately five such turns are shown, more or fewer turns could be used depending on the refrigeration capacity of the system and the amount of heat exchange surface requried for the condensing operation. The heat exchange surface 181 is preferably of a type disclosed in U.S. Pat. No. 3,458,917, the entirety of which is incorporated herein by reference. Generally, it is formed from two overlying stainless steel sheets which are spot welded such as at the locations 190 and then inflated to produce a pillowed effect between the welds and forming passages for a heat exchange fluid. The sheet is then coiled as shown.

Vertical passages 191 are formed between the turns of the heat exchange surface 181 and between the outermost turn and the sidewall of the housing 152, and between the innermost turn and the sidewall of the inverted container 165. Water entering the condenser 150 at the water inlet 36 moves vertically through the passages 191 by convection flow as will be further described. The heat exchange surface 181 is supported at its bottom end by support members 192.

The intake manifold 180 for the heat exchange surface 181 is located at the top of the outermost turn and is formed by fuse welding, an edge portion 193 near the corner rather than continuing the seam weld 194 which extends about most of the perimeter of the heat exchange surface 181. Two or three of the spot welds 190 are also eliminated at the corner so that a greater pillowing effect occurs at the corner than elsewhere throughout the surface. To strengthen the corner area, which is weakened by the elimination of the spot welds 190, stays 196 are welded as at 198 between the sheets after inflation. The corner edge is clipped to provide an opening to receive the outlet end of the coil 175 which is welded at 199. Thus, refrigerant from the coil 175 enters the inlet manifold and is thereafter distributed into the heat exchange surface 181.

At the opposite corner of the heat exchange surface 181 is an outlet manifold 200 constructed the same as the inlet manifold 180 except that it receives the upper end of a multiple turn continuous tubular coil 210 which is located beneath the inverted container 165. The turns of the coil 210 generally follows the shape of the dish shaped bottom 155 of the housing and are spaced thereabove. Its purpose is to insure liquefaction of the refrigerant within the condenser. The refrigerant outlet 112 is located at the bottom of the coil 210.

Preferably, all of the metallic parts of the condenser are of stainless steel to prevent corrosion. These include the housing 152, container 165, coils 175 and 210, and heat exchange surface 181.

In operation of the embodiment of the condenser shown in FIGS. 10 through 12, as water from the water inlet 36 at the bottom end of the housing moves upwardly by convection flow, refrigerant moves downwardly from the inlet and vertical tube 176, through the coil 175, the heat exchange surface 181, and the coil 210. More specifically, as the condenser 150 is initially filled with water, air is trapped in the top of the inverted container 165, which is fluid tight except at its bottom end, so that the water is forced to move by convection over the coil 210, vertically upward within the passages 191, over the coil 175, and into the vertical riser tube 54 through the water outlet 52. In doing so, the water absorbs the superheat from the refrigerant in the coil 175 so that the hottest water is produced at the top nearest the thermostat. This is desirable since it is the object to produce hot water as well as condense the refrigerant. The heat of condensation of the refrigerant is largely absorbed by the water at the location of the heat exchange surface 181 as the water moves upwardly by convection through the paths 191. The purpose of the coil 210 is to insure liquefaction of the refrigerant before it leaves the condenser.

The condenser of this embodiment has certain unique advantages in that it uses the characteristics of the coil heat exchange 175 to absorb the superheat of the refrigerant and produce the hottest water at the top, and further uses the pillowed heat exchange surface 181 to absorb the heat of condensation and thus carry out the condensing function with a relatively low pressure drop for the refrigerant across the heat exchange surface 181. By way of example, about 95 percent of the superheat is removed by the coil 175. As with the first described embodiment, using refrigerant 22, the hot refrigerant enters the heat exchanger at about 240° F. Cold water enters the bottom of the unit at about 60° F. and the liquid refrigerant is subcooled to about 110° F.

It has also been found that with this embodiment the vertical paths 191 provide superior stratification of the water within the condenser such that the hot water is allowed to freely move up by convection. Furthermore, the inverted container 165, in trapping air at the top and forcing the water to move vertically within the paths 191, prevents a large heat sink of accumulated water within the interior of the condenser which would require a long time to heat. Therefore, the unique structure provides a rapid build-up of the water temperature.

Operation

With the refrigeration system operating to cool the milk fed into the milk cooler 14 during the milking process, cold water at a maximum temperature of about 60° F. to 80° F. and preferably no greater than about 70° F., is fed into the cold water inlet 32 to fill the tank 18, the condenser as previously described, and the associated water plumbing so that the system is completely filled with water. When this occurs, the cold water in the condenser is heated by absorption of the superheat of the refrigerant vapor, latent heat of condensation, and part of the sensible heat of the liquid refrigerant passing through the condenser. This heating of the water in the condenser continues until the temperature of the water is sufficient to open the thermostat 82. Preferably, the thermostat is set to open so as to control the water temperature to about 140° F. When the thermostat opens, the hot water rises by convection up the riser tube 54 and into the top of the tank 18, causing the cold water in the tank to move downwardly and into the condenser where it displaces the water previously heated. As the hot water rises and the cold water enters the bottom of the condenser by convection, which is a continuous process, the water in the tank 18 becomes stratified with the hot water at the top and the cold water at the bottom, so that cold water continues to be supplied to the condenser. Eventually, the entire tank 18 may become full of hot water at the selected temperature as determined by the thermostat 82.

With the stratification occurring in the tank 18, the condenser is continually supplied with water at a sufficiently low temperature and at convection flow restricted by the thermostat to remove from the refrigerant passing through the condenser all the superheat of the refrigerant vapor, the latent heat of condensation, and part of the sensible heat of the liquid refrigerant.

The heat exchange capacity of the condenser should be sized in accordance with the cooling capacity of the refrigeration system so as to remove all of the superheat of the refrigerant vapor, the latent heat of condensation, and part of the sensible heat of the liquid refrigerant during the condensing process. It further should be sized to produce hot water, by convection flow restricted by the thermostat, at the condenser output at about 140° F. with a maximum water inlet temperature of about 60° F. to 80° F.

The operation of the mixing valve 85 and associated conduit for producing warm water is as heretofore described.

The operation of the embodiment of FIG. 8 is generally the same as that of the first-described embodiment except that twice the storage of hot water is provided by the two tanks 130 and 131. Such a system would be used where storage of large amounts of hot water is required.

The operation of the system of FIG. 9 is also very similar to the first-described embodiment except that the tank 133, having a standard external heat source, is used to further heat the water from the tank 18 if desired. Also, hot water is provided from the tank 133 during extended periods when the refrigeration system is not operating for any reason.

Various changes and modifications may be made in this invention, as will be readily apparent to those skilled in the art. Such changes and modifications are within the scope and teaching of this invention as defined by the claims appended thereto.

We claim:

1. A hot water system utilizing heat of refrigerant in a refrigeration system for producing hot water at a predetermined temperature, said system comprising a refrigeration system including a water cooled condenser having a housing with a water inlet and a water outlet, a tubular coil within the housing defining a refrigerant passage therethrough, another coil within said housing, said other coil being of a sheet type having refrigerant passages formed therein which sheet is coiled to form a heat exchanged surface within said housing, said tubular coil being joined to said sheet type coil such that a refrigerant passes through both the tubular coil and sheet type coil from an inlet at one end of said combined coils to an outlet at the other end, said condenser having water passages therein between said water inlet and outlet for directing the flow of water over said combined tubular and sheet type coil, said hot water system further comprising a water storage tank having a hot water inlet and a cold water outlet, means connecting the hot water inlet of the tank to the water outlet of said condenser, and means connecting the cold water outlet of the tank to the water inlet of said condenser.

2. The system of claim 1 wherein the condenser further comprises a vertical riser tube, means connecting the lower end of the vertical riser tube to the water outlet of the housing, and means for sensing the water temperature within said riser tube, the hot water inlet of said tank being located near the top of the tank, and the cold water outlet of said tank being located near the bottom of the tank, said system further comprising means connecting the hot water inlet of the tank to the upper end of the riser tube, and means for restricting the flow of water therethrough when the water at the location of the sensing means is below a pre-selected temperature.

3. The system of claim 2 further comprising a hot water outlet near the top of said tank and a cold water inlet near the bottom.

4. The system of claim 2 wherein the hot water outlet of said condenser is located near the top of the condenser and its cold water inlet is located near the bottom, said tubular coil being located near the top of said housing and said sheet type coil being located therebeneath with one end of said tubular coil being connected to one end of said sheet type coil, said refrigerant inlet being at the other end of said tubular coil and said refrigerant outlet being at the other end of said sheet type coil.

5. The system of claim 4 wherein said sheet type coil further comprises at least two sheets joined at spaced points over substantially the entire surface thereof, said refrigerant passages of said sheet type coil being formed between said locations to define a generally pillowed heat exchange surface.

6. A hot water system utilizing heat of refrigerant in a refrigeration system for producing hot water at a predetermined temperature, said system comprising a refrigeration system including a water cooled condenser having a housing with a water inlet and a water outlet, said housing having top, bottom and side walls, a container within the housing and having top and side walls with the side walls of the container spaced inwardly from the side walls of the housing and the top wall of the container spaced inwardly from the top wall of the housing, said spacings defining passages for the flow of water therethrough between the water inlet and the water outlet, heat exchange surface means located within said spaces and having passage means therein for the flow of refrigerant therethrough from a refrigerant inlet to a refrigerant outlet, said container being fluid tight except at the lower end thereof whereby water entering said container at said lower end traps air in the top of said container forcing the water to flow through the passages between said housing and said container and over said heat exchange surface means, said hot water system further comprising a water storage tank having a hot water inlet and a cold water outlet, means connecting the hot water inlet of the tank to the water outlet of said condenser, and means connecting the cold water outlet of the tank to the water inlet of said condenser.

7. The system of claim 6 wherein the condenser further comprises a vertical riser tube, means connecting the lower end of the vertical riser tube to the water outlet of the housing, and means for sensing the water temperature within said riser tube, the hot water inlet of said tank being located near the top of the tank, and the cold water outlet of said tank being located near the bottom of the tank, said system further comprising means connecting the hot water inlet of the tank to the upper end of the riser tube, and means for restricting the flow of water therethrough when the water at the location of the sensing means is below a pre-selected temperature.

8. The system of claim 7 further comprising a hot water outlet near the top of the tank and a cold water inlet near the bottom.

9. A hot water system utilizing heat of refrigerant in a refrigeration system for producing hot water at a predetermined temperature, said system comprising a refrigeration system including a water cooled condenser having a housing with a water inlet at the bottom and a water outlet at the top, said housing having generally disc shaped top and bottom walls and an annular side wall, a container within said housing, said container having a top wall and a generally annular side wall with the top and side walls of said container being spaced inwardly from the top and side walls of said housing, said container having an opening at the bottom end thereof above said water inlet, water passage means defined between the bottom of said housing and the bottom end of said container and within the spacings between the side and top walls of said housing and container, said container being fluid tight except at its bottom end, a heat exchange surface within said spacing, said heat exchange surface comprising a tubular coil located within the spacings between the top of said housing and container, said coil having a refrigerant passage therethrough and having multiple windings that increase in size from the inner most winding to the outer most winding, the axes of said annular winding being generally vertical, a sheet type coil located in the spacing between the walls of said housing and container, said sheet type coil having multiple windings that increase in size from its inner most winding to its outer most winding and having refrigerant passages therein, one end of said tubular coil being connected to one end of said sheet type coil with the other end of said tubular coil defining a refrigerant inlet and the other end of said sheet type coil defining a refrigerant outlet, said sheet type coil being characterized as providing a relatively low pressure drop for the refrigerant as it passes therethrough, whereby water entering the bottom of said housing and the bottom of said container traps air in the top of said container, said water flowing between the side and top walls of said housing and container and between the windings of said coils to heat said water as it moves vertically upward to the water outlet at the top of said housing with most of the superheat of the refrigerant removed in said tubular coil and the latent heat of condensation removed in said sheet type coil, said hot water system further comprising a water storage tank having a hot water inlet and a cold water outlet, means connecting the hot water inlet of the tank to the water outlet of said condenser, and means connecting the cold water outlet of the tank to the water inlet of said condenser.

10. The system of claim 9 wherein the condenser further comprises a vertical riser tube, means connecting the lower end of the vertical riser tube to the water outlet of the housing, and means for sensing the water temperature within said riser tube, the hot water inlet of said tank being located near the top of the tank, and the cold water outlet of said tank being located near the bottom of the tank, said system further comprising means connecting the hot water inlet of the tank to the upper end of the riser tube, and means for restricting the flow of water therethrough when the water at the location of the sensing means is below a pre-selected temperature.

11. The system of claim 10 further comprising a hot water outlet near the top of said tank and a cold water inlet near the bottom.

12. The system of claim 9 wherein the sheet type coil further comprises at least two sheets joined at spaced points over substantially the entire surface thereof, said refrigerant passages of said sheet type coil being formed between said locations to define a generally pillowed heat exchange surface.

* * * * *